(12) United States Patent
Yamauchi et al.

(10) Patent No.: US 10,763,531 B2
(45) Date of Patent: Sep. 1, 2020

(54) PROTON CONDUCTOR AND MEMBRANE ELECTRODE ASSEMBLY

(71) Applicant: Panasonic Intellectual Property Management Co., Ltd., Osaka (JP)

(72) Inventors: Kosuke Yamauchi, Osaka (JP); Yuichi Mikami, Kyoto (JP); Tomohiro Kuroha, Osaka (JP); Yuji Okuyama, Miyazaki (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 121 days.

(21) Appl. No.: 16/195,857

(22) Filed: Nov. 20, 2018

(65) Prior Publication Data
US 2019/0181481 A1 Jun. 13, 2019

(30) Foreign Application Priority Data

Dec. 12, 2017 (JP) .................................. 2017-237481

(51) Int. Cl.
*H01M 8/1213* (2016.01)
*H01M 4/90* (2006.01)
*H01M 8/1253* (2016.01)
*C04B 35/626* (2006.01)
*C04B 35/638* (2006.01)
*C04B 35/488* (2006.01)
*H01M 8/124* (2016.01)

(52) U.S. Cl.
CPC ......... *H01M 8/1213* (2013.01); *C04B 35/488* (2013.01); *C04B 35/6264* (2013.01); *C04B 35/62615* (2013.01); *C04B 35/62675* (2013.01); *C04B 35/638* (2013.01); *H01M 4/905* (2013.01); *H01M 4/9033* (2013.01); *H01M 8/1253* (2013.01); *C04B 2235/3215* (2013.01); *C04B 2235/3224* (2013.01); *C04B 2235/3244* (2013.01); *C04B 2235/3279* (2013.01); *C04B 2235/443* (2013.01); *C04B 2235/449* (2013.01); *C04B 2235/604* (2013.01); *C04B 2235/606* (2013.01); *C04B 2235/768* (2013.01); *C04B 2235/81* (2013.01); *H01M 2008/1293* (2013.01); *H01M 2300/0077* (2013.01)

(58) Field of Classification Search
None
See application file for complete search history.

(56) References Cited

U.S. PATENT DOCUMENTS

2001/0018989 A1  9/2001  Taniguchi

FOREIGN PATENT DOCUMENTS

JP  2001-307546  11/2001
JP  2005-336022  12/2005

OTHER PUBLICATIONS

Park, Yu-Eun et al., "Pore structure improvement in cermet for anode-supported protonic ceramic fuel cells", 2013, Ceramics International, 39, pp. 2581-2587. (Year: 2013).*

* cited by examiner

*Primary Examiner* — Karie O'Neill Apicella
(74) *Attorney, Agent, or Firm* — McDermott Will & Emery LLP

(57) ABSTRACT

A proton conductor of the present disclosure has a composition formula of $Ba_aZr_{1-x-y}Yb_xNi_yO_{3-\delta}$ ($0.95 \leq a \leq 1.05$, $0.1 \leq x \leq 0.4$, and $0.15 \leq y \leq 0.30$).

7 Claims, 4 Drawing Sheets

PROTON CONDUCTOR AND MEMBRANE ELECTRODE ASSEMBLY

BACKGROUND

1. Technical Field

The present disclosure relates to a proton conductor and a membrane electrode assembly for an electrochemical device, the membrane electrode assembly including the proton conductor.

2. Description of the Related Art

An example of an electrochemical device that includes an electrolyte material formed of a solid oxide is a solid oxide fuel cell (hereinafter, SOFC). Oxide ionic conductors, typically represented by stabilized zirconia, are widely used as electrolyte materials for SOFCs. The ionic conductivity of oxide ionic conductors decreases as the temperature decreases, and thus solid oxide fuel cells in which stabilized zirconia is used as the electrolyte material need to operate at a temperature of 700° C. or higher, for example.

However, when an electrochemical device including an electrolyte material formed of a solid oxide, such as an SOFC, needs to operate at a high temperature, the metal material used in structural members, for example, needs to be a special heat-resistant metal, which is expensive, and as a result, the cost of the entire fuel cell system increases. In addition, since the thermal expansion difference at the startup and shutdown is large, a problem arises in that the probability of cracking increases, and consequently the reliability of the entire fuel cell system decreases.

In view of this, electrolyte materials having increased reliability have been proposed. Examples of such materials include ion conductors each including a perovskite-type composite oxide having a composition represented by $BaCe_{1-x}M_xO_{3-\alpha}$, $BaZr_{1-x-y}Ce_xM_yO_{3-\alpha}$, or $BaZr_{1-x}M_xO_{3-\alpha}$ (M is a trivalent substituent element) (e.g., Japanese Unexamined Patent Application Publication No. 2001-307546). The ion conductor disclosed in Japanese Unexamined Patent Application Publication No. 2001-307546 is a highly reliable material such that, even when the material is boiled for 100 hours, no decomposition products or precipitates are observed in the material.

However, the process of manufacturing the ion conductor disclosed in Japanese Unexamined Patent Application Publication No. 2001-307546 requires sintering at 1650° C. for 10 hours and thus poses a problem in that the sinterability at low temperatures is insufficient. In view of this, ion conductors for which the sintering temperature in the process of manufacturing is decreased have been proposed (e.g., Japanese Unexamined Patent Application Publication No. 2005-336022). Japanese Unexamined Patent Application Publication No. 2005-336022 discloses a proton-conductive ceramic for which the sintering temperature is decreased. This is achieved by incorporating in advance a transition metal as the trivalent substituent element M.

SUMMARY

However, in the related art, the proton conductivity of the electrolyte material has not been sufficiently studied. One non-limiting and exemplary embodiment of the present disclosure provides a proton conductor that has improved proton conductivity.

In one general aspect, the techniques disclosed here feature a proton conductor having a composition formula of $Ba_aZr_{1-x-y}Yb_xNi_yO_{3-\delta}$ ($0.95 \leq a \leq 1.05$, $0.1 \leq x \leq 0.4$, and $0.15 \leq y \leq 0.30$).

An embodiment of the present disclosure is configured as described above and produces an effect of improving proton conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
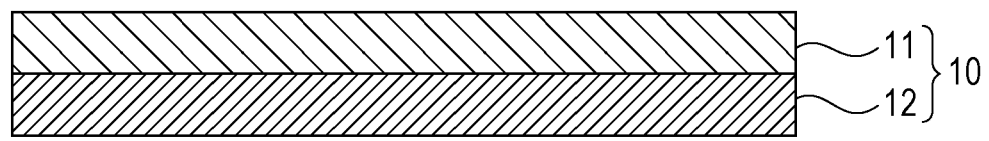
FIG. 1 is a diagram schematically illustrating a configuration of a membrane electrode assembly according to an embodiment of the present disclosure.

Underlying Knowledge Forming Basis of the Present Disclosure

The present inventors diligently performed studies regarding the above-described proton conductors of the related art. As a result, the following findings were obtained.

It is generally known that, in the single cell of an SOFC, NiO is used in the fuel-side electrode. The present inventors found that, in the process of manufacturing the single cell of an SOFC, when the solid electrolyte membrane includes a proton conductor and the fuel-side electrode includes Ni, a phenomenon in which Ni diffuses from the fuel electrode toward the solid electrolyte membrane occurs. Further, the present inventors noticed that diffusion of Ni causes the balance of the predetermined composition ratio of the proton conductor to be lost, which results in a decrease in proton conductivity. For example, when a proton conductor is formed of a perovskite-type composite oxide containing Ba, Zr, and Yb, the composition ratio between Ba, Zr, and Yb is predetermined, but diffusion of Ni from the fuel electrode causes the balance of the composition ratio to be lost. This problem is also encountered by the proton conductor (proton-conductive ceramic) disclosed in Japanese Unexamined Patent Application Publication No. 2005-336022, in which Ni is added to the proton conductor to improve low-temperature sinterability associated with the process of manufacturing.

The present inventors found that the decrease in proton conductivity can be inhibited by adding Ni in advance and producing a solid electrolyte membrane while ensuring that the balance of the composition ratio of the proton conductor is not lost. Specifically, the present inventors found that, when producing a solid electrolyte membrane, by adding Ni in advance in such a manner that the proton conductor has no room into which Ni diffused from the fuel electrode can enter, the loss of balance of the composition ratio can be prevented. It is to be noted that, when Ni diffused from the fuel electrode is to be prevented from entering into the proton conductor, it is necessary to add, in advance, to the proton conductor, Ni in an amount greater than its solid solubility limit. Thus, Ni that cannot enter into the crystal structure of the proton conductor appears as nickel oxide in the solid electrolyte membrane.

That is, the present inventors found that, when Ni is added in advance in an amount greater than its solid solubility limit to the proton conductor, an effect of a remarkable improvement in proton conductivity is produced.

In addition, the present inventors found that it is preferable that the proton conductor be formed of an oxide containing Ba, Zr, and Yb. When a proton conductor included in the solid electrolyte membrane of an SOFC is formed of an oxide containing Ba, Zr, and Y, for example, Y reacts with Ni migrating from the fuel electrode. The present inventors found that, when the proton conductor is formed of an oxide containing Ba, Zr, and Yb, Yb does not react with Ni, and thus such an oxide is preferable.

In connection with this, the present inventors noticed that Japanese Unexamined Patent Application Publication No. 2005-336022 is directed toward improving low-temperature sinterability associated with the process of manufacturing and does not address the decrease in proton conductivity due to diffusion of Ni from the fuel electrode to the electrolyte.

The above-described findings by the present inventors have been unknown to date. The findings enable discovery of new challenges and include new technical features that produce significant advantageous effects. Specifically, the present disclosure provides the aspects described below.

According to a first aspect of the present disclosure, a proton conductor has a composition formula of $Ba_aZr_{1-x-y}Yb_xNi_yO_{3-\delta}$ ($0.95 \leq a \leq 1.05$, $0.1 \leq x \leq 0.4$, and $0.15 \leq y \leq 0.30$).

In the configuration described above, the proton conductor includes Ni added in an amount in a range of $0.15 \leq y \leq 0.30$. Here, it is noted that the solid solubility limit of Ni in a perovskite-type composite oxide containing Ba, Zr, and Yb is in a range of y=0.15 to 0.20. Thus, the balance of the composition ratio of the proton conductor is not lost even if, for example, diffused Ni migrates to the proton conductor according to the first aspect of the present disclosure, and consequently the decrease in proton conductivity is prevented. Thus, by ensuring that the composition formula of the proton conductor is the composition formula described above, the decrease in proton conductivity when Ni is in solid solution is inhibited and a high proton conductivity is achieved.

Accordingly, the proton conductor according to the first aspect of the present disclosure produces the effect of improving proton conductivity.

According to a second aspect of the present disclosure, in the proton conductor according to the first aspect, Ni may be present, for example, at the solid solubility limit of Ni in the proton conductor.

According to a third aspect of the present disclosure, in the proton conductor according to the first aspect, a in the composition formula may satisfy, for example, $0.95 \leq a \leq 1.00$.

According to a fourth aspect of the present disclosure, in the proton conductor according to the first aspect, y in the composition formula may satisfy, for example, $0.20 \leq y \leq 0.30$.

According to a fifth aspect of the present disclosure, a membrane electrode assembly includes a solid electrolyte membrane including the proton conductor according to the first aspect and an electrode including at least Ni and being in contact with the solid electrolyte membrane.

With the configuration described above, even if diffused Ni migrates from the electrode into the solid electrolyte membrane, the balance of the composition ratio of the proton conductor included in the solid electrolyte membrane is not lost, and consequently the decrease in proton conductivity is prevented.

Accordingly, the membrane electrode assembly according to the fifth aspect of the present disclosure produces the effect of improving proton conductivity.

According to a sixth aspect of the present disclosure, the solid electrolyte membrane of the membrane electrode assembly according to the fifth aspect may, for example, include NiO.

Here, it is noted that the presence of NiO in the solid electrolyte membrane means that Ni is present in advance at the solid solubility limit of Ni in the proton conductor included in the solid electrolyte membrane.

Thus, with the configuration described above, even if diffused Ni migrates from the electrode into the solid electrolyte membrane, the balance of the composition ratio of the proton conductor included in the solid electrolyte membrane is not lost, and consequently the decrease in proton conductivity is prevented.

According to a seventh aspect of the present disclosure, the electrode of the membrane electrode assembly according to the fifth aspect may, for example, include a proton conductor having a composition formula of $Ba_aZr_{1-x-y}Yb_xNi_yO_{3-\delta}$ ($0.95 \leq a \leq 1.05$, $0.1 \leq x \leq 0.4$, and $0.15 \leq y \leq 0.30$).

In the configuration described above, the electrode includes a proton conductor having the same composition formula as the proton conductor of the solid electrolyte membrane. With the configuration, when the electrode is used as, for example, the fuel-side electrode in the membrane electrode assembly, the proton conductivity for protons traveling from the fuel-side electrode toward the air-side electrode via the solid electrolyte membrane is improved.

Embodiments of the present disclosure will now be described with reference to the drawings. In the following description, like reference characters designate identical or corresponding components throughout the drawings, and descriptions of such components may be omitted.

Embodiments

Configuration of Membrane Electrode Assembly

A membrane electrode assembly 10, according to an embodiment of the present disclosure, will be described with reference to FIG. 1. FIG. 1 is a diagram schematically illustrating a configuration of the membrane electrode assembly 10 according to a first embodiment of the present disclosure. The membrane electrode assembly 10 is used as a component in an electrochemical device. As illustrated in FIG. 1, the membrane electrode assembly 10 includes an electrode 11 and a solid electrolyte membrane 12, and, in the structure, the electrode 11 is in contact with the solid electrolyte membrane 12. In other words, in the structure of the membrane electrode assembly 10, one side of the solid electrolyte membrane 12 is in contact with the electrode 11, with the solid electrolyte membrane 12 and the electrode 11 being layered together. Examples of the electrochemical device include fuel cells, gas sensors, hydrogen pumps, and water electrolysis devices.

The electrode 11 may include at least Ni and may include a proton conductor material having a composition formula of $Ba_aZr_{1-x-y}Yb_xNi_yO_{3-\delta}$ ($0.95 \le a \le 1.05$, $0.1 \le x \le 0.4$, and $0.15 \le y \le 0.30$). When the electrode 11 is used, for example, as an electrode of a membrane electrode assembly 10 included in a solid oxide fuel cell, the electrode 11 may be the fuel-side electrode. In this specification, $\delta$ denotes a value representing an oxygen deficiency and satisfies the relationship of $0 < \delta < 3.0$.

The solid electrolyte membrane 12 includes a proton conductor material having proton-conducting properties and having a composition formula of $Ba_aZr_{1-x-y}Yb_xNi_yO_{3-\delta}$ ($0.95 \le a \le 1.05$, $0.1 \le x \le 0.4$, and $0.15 \le y \le 0.30$). Furthermore, the solid electrolyte membrane 12 may include NiO in addition to the proton conductor described above. When the solid electrolyte membrane 12 is used as the electrolyte membrane of the membrane electrode assembly 10, the solid electrolyte membrane 12 may be as thin as possible so as to reduce the ohmic resistance (IR resistance) of the solid electrolyte membrane 12. In the above-described composition formula of the proton conductor, a (ratio of Ba) may be in a range of 0.95 or greater and 1.05 or less ($0.95 \le a \le 1.05$). To reduce the production of byproduct Ba compounds, such as $BaCO_3$, due to unreacted Ba, a in the composition formula is preferably 0.95 or greater and 1.00 or less ($0.95 \le a \le 1.00$) and is more preferably 0.95 or greater and 0.98 or less ($0.95 \le a \le 0.98$). It is possible that a in the composition formula may be 1.00.

The range of x in the above-described composition formula of the proton conductor is a range in which sufficient proton-conducting properties are exhibited by the proton conductor. The range of y is a range in which improvement in proton-conducting properties was observed, as derived from the results of Examples, which will be described later. For example, the range may be $0.15 \le y \le 0.30$ and preferably be $0.20 \le y \le 0.30$.

In the membrane electrode assembly 10 according to the embodiment, the solid electrolyte membrane 12 includes a proton conductor having a composition formula of $Ba_aZr_{1-x-y}Yb_xNi_yO_{3-\delta}$ ($0.95 \le a \le 1.05$, $0.1 \le x \le 0.4$, and $0.15 \le y \le 0.30$), and in particular, the amount of added Ni is $0.15 \le y \le 0.30$. That is, the proton conductor has a configuration including a perovskite-type composite oxide that contains Ba, Zr, and Yb and to which Ni is added in advance at its solid solubility limit. Thus, in the case that the membrane electrode assembly 10 is produced using the solid electrolyte membrane 12, even when, for example, Ni diffuses from the electrode 11 toward the solid electrolyte membrane 12, the balance of the composition ratio of the proton conductor is not lost. Consequently, with the membrane electrode assembly 10 according to the embodiment, the decrease in proton conductivity due to loss of balance of the composition ratio is prevented.

In the process of manufacturing the solid electrolyte membrane 12, the production of the proton conductor containing Ni added at its solid solubility limit involves preparing in advance Ni in an amount greater than the solid solubility limit. Thus, as a result, Ni that cannot enter the proton conductor is present as NiO in the solid electrolyte membrane 12.

Also, the electrode 11 may be configured to be the fuel-side electrode and include a proton conductor having a composition formula of $Ba_aZr_{1-x-y}Yb_xNi_yO_{3-\delta}$ ($0.95 \le a \le 1.05$, $0.1 \le x \le 0.4$, and $0.15 \le y \le 0.30$). Such a configuration improves the proton conductivity for protons traveling from the fuel-side electrode 11 toward the air-side electrode (not illustrated) via the solid electrolyte membrane 12.

Synthesis Process

Figure 2:
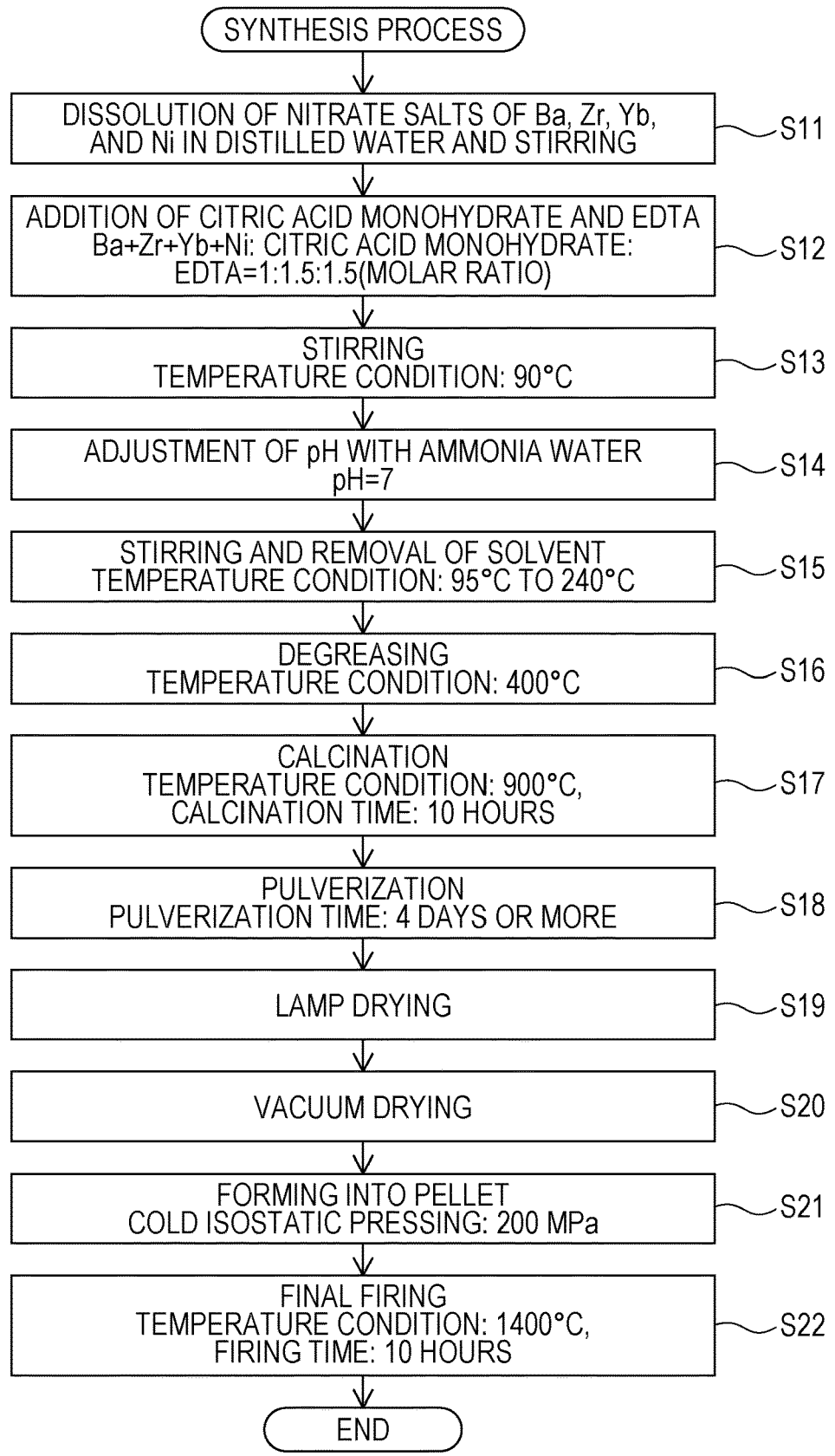
FIG. 2 is a flowchart illustrating an example of a synthesis process for a proton conductor according to an embodiment of the present disclosure.

A synthesis process for the proton conductor included in the electrode 11 or the solid electrolyte membrane 12 according to the embodiment will be described with reference to FIG. 2. FIG. 2 is a flowchart illustrating an example of a synthesis process for the proton conductor according to the embodiment.

The proton conductor according to the embodiment was prepared by using a citrate complex method using powders of $Ba(NO_3)_2$ (available from Kanto Chemical Co., Inc.), $ZrO(NO_3)_2 \cdot 2H_2O$ (available from Kanto Chemical Co., Inc.), $Yb(NO_3)_3 \cdot xH_2O$ (available from Kojundo Chemical Laboratory Co., Ltd.), and $Ni(NO_3)_2 \cdot 6H_2O$ as starting materials.

First, powders of nitrate salts of Ba, Zr, Yb, and Ni, weighed out according to a predetermined ratio, were dissolved in distilled water and stirred (step S11). Subsequently, 1.5 equivalents of citric acid monohydrate (available from Kanto Chemical Co., Inc.) and 1.5 equivalents of ethylenediamine tetra acetic acid (EDTA) (available from Kanto Chemical Co., Inc.), relative to the metal cations, were added (step S12), and thereafter stirring was performed at 90° C. (step S13).

Next, the pH was adjusted to 7 by using ammonia water (28%) (available from Kanto Chemical Co., Inc.) (step S14). After pH adjustment, stirring was performed at 95° C. to 240° C. by using a hot stirrer, and thereby the solvent was removed (step S15). The resulting solid was pulverized in a mortar, and thereafter debindering was performed at approximately 400° C. (step S16).

After debindering, the resulting powder was press-molded into a cylindrical shape and was then calcined at 900° C. for 10 hours (step S17). After calcination, the powder obtained by rough pulverization was placed in a plastic container with zirconia balls and was then pulverized with ethanol by using a ball mill for 4 days or more (step S18).

After the pulverization using the ball mill, the solvent was removed by performing lamp drying (step S19), and the resulting powder was vacuum-dried at 200° C. (Step S20). Thereafter, the powder was formed into a pellet by performing cold isostatic pressing at a press pressure of 200 MPa (step S21), and firing was then performed at 1400° C. for 10 hours, and thereby a sintered product was obtained (step S22).

The sintered products of Examples 1 and 2 and Comparative Example 1 were prepared by the synthesis process described above. By using the sintered products, the evaluation of proton conductivity, which will be described later, was performed. In the synthesis process described above, the proton conductor included in the electrode 11 or the solid electrolyte membrane 12 was synthesized by using a citrate complex method; however, the synthesis method is not limited thereto, and another method, such as a solid phase sintering method, a coprecipitation method, a nitrate salt method, or a spray granulation method, may be used.

Analysis of Crystal Structure

Figure 3:
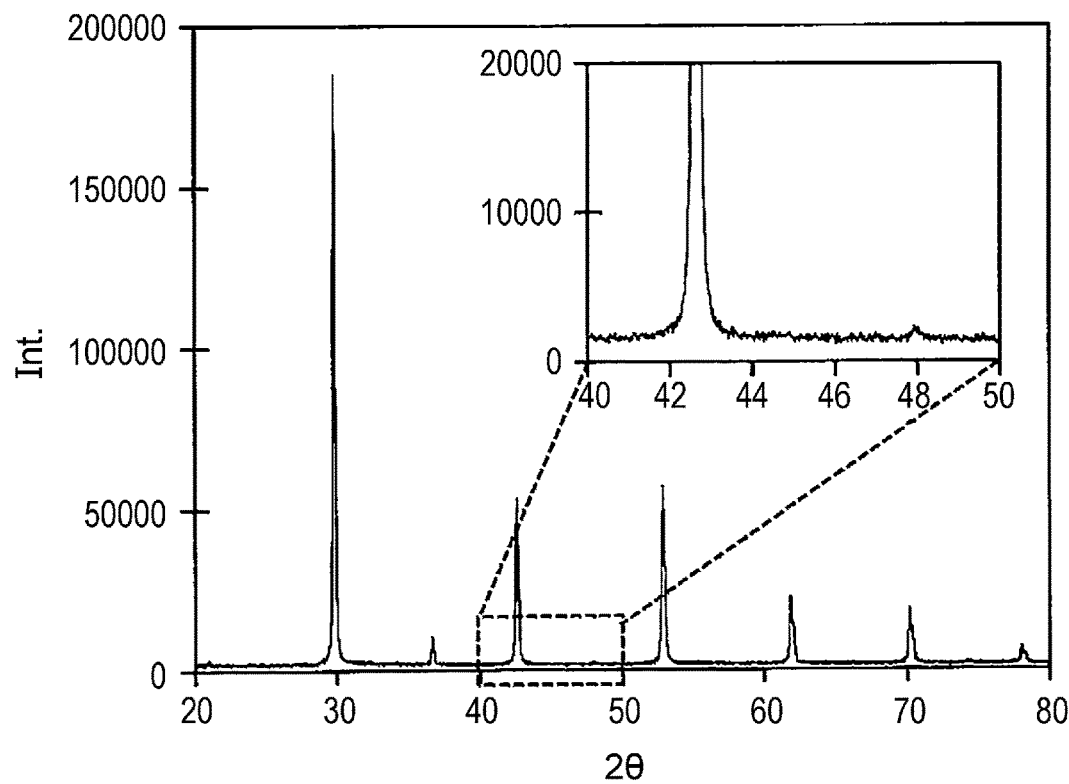
FIG. 3 is a graph illustrating the results of an X-ray structure analysis measurement performed on $BaZr_{0.65}Yb_{0.2}Ni_{0.15}O_{3-\delta}$ according to an embodiment of the present disclosure after a reduction process.
Figure 4:
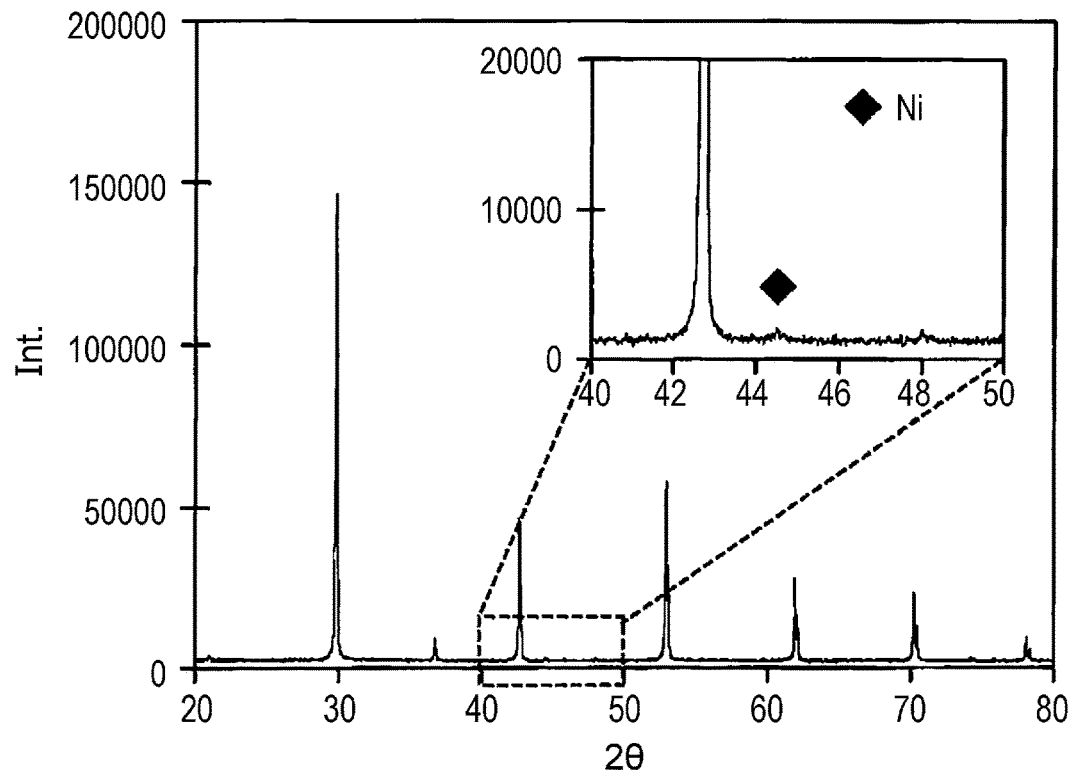
FIG. 4 is a graph illustrating the results of an X-ray structure analysis measurement performed on $BaZr_{0.6}Yb_{0.2}Ni_{0.2}O_{3-\delta}$ according to an embodiment of the present disclosure after a reduction process.

First, to investigate the solid solubility limit of Ni, proton conductors formed by the synthesis process described above were prepared. One of the proton conductors had a composition formula of $BaZr_{0.65}Yb_{0.2}Ni_{0.15}O_{3-\delta}$, and the other of the proton conductors had a composition formula of $BaZr_{0.6}Yb_{0.2}Ni_{0.2}O_{3-\delta}$. The crystal structure of each of the proton conductors was analyzed by performing X-ray structure analysis. The X-ray structure analysis measurement was performed by using an X-ray diffractometer available from Rigaku Corporation. The results of the X-ray structure analysis measurement will be described with reference to FIGS. 3 and 4. FIG. 3 is a graph illustrating the results of the X-ray structure analysis measurement performed on $BaZr_{0.65}Yb_{0.2}Ni_{0.15}O_{3-\delta}$ according to the embodiment of the present disclosure after a reduction process. FIG. 4 is a graph illustrating the results of the X-ray structure analysis measurement performed on $BaZr_{0.6}Yb_{0.2}Ni_{0.2}O_{3-\delta}$ according to the embodiment of the present disclosure after a reduction process. In FIGS. 3 and 4, the horizontal axis represents the diffraction angle (2θ°), and the vertical axis represents the intensity.

As illustrated in FIG. 4, the results of the X-ray structure analysis measurement of $BaZr_{0.6}Yb_{0.2}Ni_{0.2}O_{3-\delta}$ revealed a new diffraction peak. The diffraction peak was identified as Ni by using integrated X-ray powder diffraction software PDXL (available from Rigaku). On the other hand, as illustrated in FIG. 3, the results of the X-ray structure analysis measurement of $BaZr_{0.65}Yb_{0.2}Ni_{0.15}O_{3-\delta}$ revealed no diffraction peak attributable to Ni.

The results of the X-ray structure analysis measurement shown in FIGS. 3 and 4 indicate that the solid solubility limit of Ni in $BaZr_{1-x-y}Yb_xNi_yO_{3-\delta}$ is higher than y=0.15 and not higher than y=0.20.

Next, the proton conductivity of each of Examples 1 and 2, according to the embodiment of the present disclosure, and the proton conductivity of Comparative Example 1 were evaluated. The evaluation of the proton conductivity will be described below.

Evaluation of Proton Conductivity

First, the sintered product obtained from the synthesis process described above was processed into a disk shape, and the surface was polished with a wrapping film sheet coated with 3-μm abrasive grains. Accordingly, evaluation samples were prepared. The resulting disk-shaped sample was coated with a Ag paste (available from Tanaka Kikinzoku Kogyo K.K.) by screen printing and fired at 900° C. for 1 hour.

The proton conductivity of each of the evaluation samples relating to Comparative Example 1 and Examples 1 and 2, prepared as described above, was evaluated. The proton conductor having a composition formula of $BaZr_{1-x-y}Yb_xNi_yO_{3-\delta}$ where x=0.2, and y=0.15 is Example 1, and the proton conductor having a composition formula of $BaZr_{1-x-y}Yb_xNi_yO_{3-\delta}$ where x=0.2, and y=0.3 is Example 2. The proton conductor having a composition formula of $BaZr_{1-x-y}Yb_xNi_yO_{3-\delta}$ where x=0.2, and y=0.075 is Comparative Example 1. According to the results described above in the section "Analysis of Crystal Structure", it can be said that Example 1 is an example in which Ni was added in an amount close to its solid solubility limit in the proton conductor described above and Example 2 is an example in which Ni was added in an amount greater than its solid solubility limit in the proton conductor described above. Furthermore, it can be said that Comparative Example 1 is an example in which Ni was added in a small amount, which was below its solid solubility limit.

Figure 5:
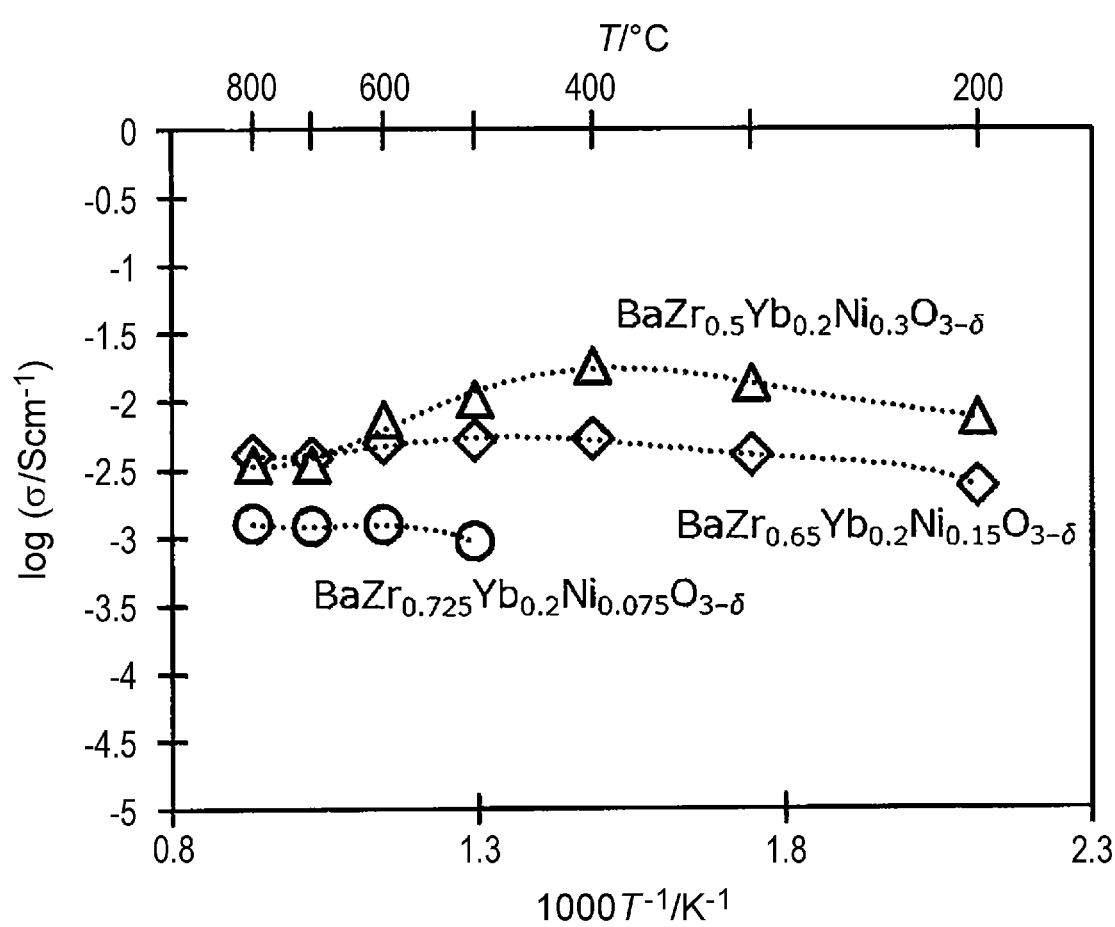
FIG. 5 is a graph illustrating the relationship between the proton conductivity and the temperature in each of Examples 1 and 2, according to an embodiment of the present disclosure, and in Comparative Example 1.

The proton conductivity was measured by using an alternating current impedance method. The alternating current impedance measurement was carried out in a 20° C. humidified hydrogen atmosphere. Alternating current was applied by using a Solartron 1287, at an amplitude of 10 mV and frequencies in a range of 100 kHz to 0.01 Hz. Based on the circular arc of the Cole-Cole plot that appeared in the frequency range from approximately 1000 Hz to 0.01 Hz, the high-frequency-side intersection point of the circular arc and the real axis was determined to be the IR resistance. The proton conductivity was calculated using the value of the IR resistance and the thickness of the electrolyte (approximately 500 μm). The results shown in FIG. 5 were obtained from the measurement of the proton conductivity. FIG. 5 is a graph illustrating the relationship between the proton conductivity and the temperature in each of Examples 1 and 2 according to the embodiment of the present disclosure and in Comparative Example 1. In FIG. 5, the horizontal axis represents the temperature (the upper horizontal axis represents the temperature in Celsius, and the lower horizontal axis represents the temperature converted to Kelvin), and the vertical axis represents the proton conductivity.

As shown in FIG. 5, the proton conductor according to Example 1 ($BaZr_{0.65}Yb_{0.2}Ni_{0.15}O_{3-\delta}$) and the proton conductor according to Example 2 ($BaZr_{0.5}Yb_{0.2}Ni_{0.3}O_{3-\delta}$) each had improved proton conductivity compared with the proton conductivity according to Comparative Example 1 ($BaZr_{0.725}Yb_{0.2}Ni_{0.075}O_{3-\delta}$). It was found that, when the proton conductor is used as a solid electrolyte membrane of a solid oxide fuel cell, for example, the proton conductor according to Example 1 and the proton conductor according to Example 2 each exhibit improved proton conductivity even in the operating temperature range (600° C. to 800° C.), compared with the proton conductor according to Comparative Example 1. One possible factor responsible for the improvement in proton conductivity is improvement in the proton carrier in the solid.

Furthermore, it was found that the proton conductor according to Example 2, in particular, had further improved proton conductivity even at low temperatures (e.g., in a range of 300° C. to 500° C.). This result indicates that the proton conductor can be a candidate material of the solid electrolyte membrane of a solid oxide fuel cell that operates at a low temperature.

From the foregoing description, it will be apparent to those skilled in the art that the present disclosure encompasses many modifications and other embodiments. Therefore, it is to be understood that the foregoing description is to be interpreted as illustrative and is provided to teach those skilled in the art the best mode for applying the present disclosure. The details of the structure and/or the functionality of the present disclosure may be substantially changed without departing from the spirit of the disclosure.

The membrane electrode assembly according to the present disclosure may be used in, for example, electrochemical devices, such as fuel cells, gas sensors, hydrogen pumps, and water electrolysis devices.

What is claimed is:

1. A proton conductor having a composition formula of $Ba_aZr_{1-x-y}Yb_xNi_yO_{3-\delta}$ (0.95≤a≤1.05, 0.1≤x≤0.4, and 0.15≤y≤0.30).

2. The proton conductor according to claim 1, wherein Ni is present at a solid solubility limit of Ni in the proton conductor.

3. The proton conductor according to claim 1, wherein a in the composition formula satisfies 0.95≤a≤1.00.

4. The proton conductor according to claim 1, wherein y in the composition formula satisfies 0.20≤y≤0.30.

5. A membrane electrode assembly comprising:
   a solid electrolyte membrane including the proton conductor according to claim 1; and
   an electrode including at least Ni and being in contact with the solid electrolyte membrane.

6. The membrane electrode assembly according to claim 5, wherein the solid electrolyte membrane includes NiO.

7. The membrane electrode assembly according to claim 5, wherein the electrode includes a proton conductor having a composition formula of $Ba_aZr_{1-x-y}Yb_xNi_yO_{3-\delta}$ ($0.95 \leq a \leq 1.05$, $0.1 \leq x \leq 0.4$, and $0.15 \leq y \leq 0.30$).

* * * * *